United States Patent [19]

Neunzert

[11] Patent Number: 4,896,764

[45] Date of Patent: Jan. 30, 1990

[54] MONORAIL ADVANCED SYSTEM FOR CONVEYORS IN A MINING APPARATUS

[75] Inventor: Michael G. Neunzert, Mountain View, Wyo.

[73] Assignee: Tg Soda Ash, Inc., Granger, Wyo.

[21] Appl. No.: 229,620

[22] Filed: Aug. 8, 1988

[51] Int. Cl.⁴ .............................................. B65G 21/14
[52] U.S. Cl. ..................................... 198/812; 198/594; 198/861.2
[58] Field of Search ............. 198/812, 588, 594, 861.2

[56] References Cited

U.S. PATENT DOCUMENTS

| | | | |
|---|---|---|---|
| 1,030,226 | 6/1912 | Billings | 198/812 |
| 2,992,723 | 7/1961 | Poundstone | 198/812 |
| 3,039,596 | 6/1962 | Poundstone | 198/812 |
| 3,204,755 | 9/1965 | Caine | 198/594 |
| 3,920,115 | 11/1975 | Craggs | 198/812 |
| 4,061,223 | 12/1977 | McGinnis | 198/861.2 |
| 4,339,031 | 7/1982 | Densmore | 198/861.2 |
| 4,526,272 | 7/1985 | Peterson | 198/861.2 |
| 4,784,257 | 11/1988 | Doerr | 198/861.2 |
| 4,798,279 | 1/1989 | Doerr et al. | 198/594 |

Primary Examiner—Joseph E. Valenza
Attorney, Agent, or Firm—Bell, Seltzer, Park & Gibson

[57] ABSTRACT

The invention comprises an apparatus for carrying, advancing and retracting a conveyor in a mine. The invention eliminates the need for separate storage of unused conveyor material and provides a conveyor which can be either advanced or retracted at will and while loaded and operating. The invention comprises a monorail fixed to the roof of a mining tunnel, an elongate truss assembly movably suspended from the monorail, and a conveyor carried by the truss assembly. The monorail defines the path of travel for the truss and the position of the conveyor can be advanced and retracted within the tunnel by advancing or retracting the truss along the monorail.

15 Claims, 4 Drawing Sheets

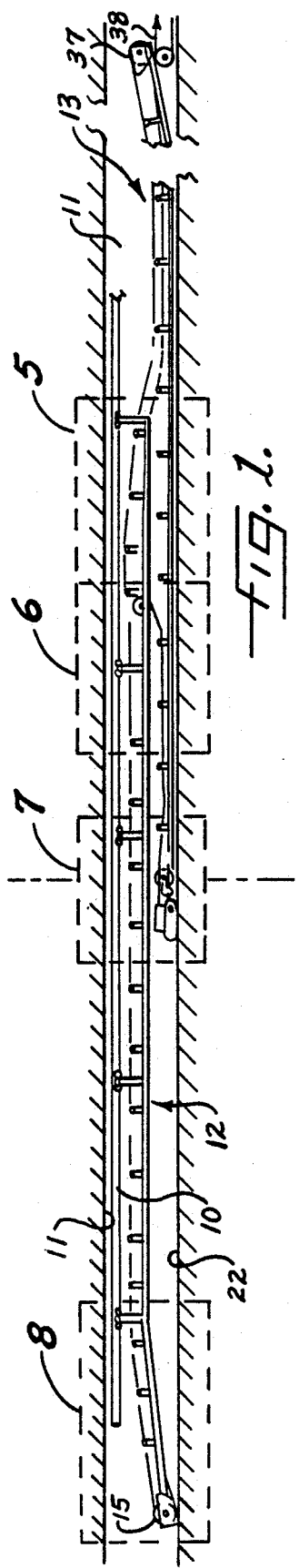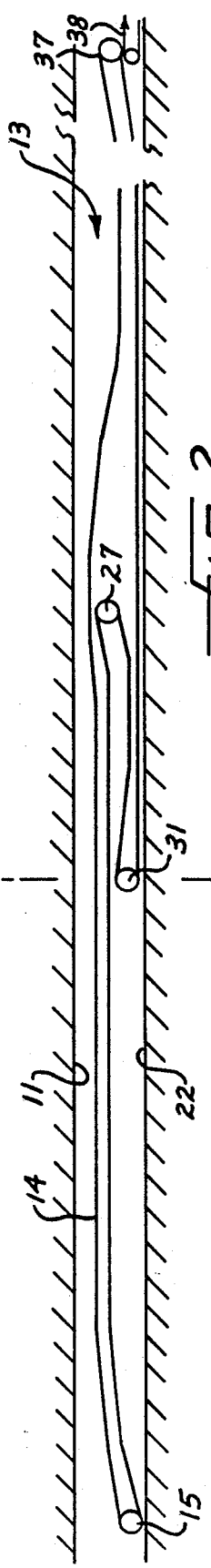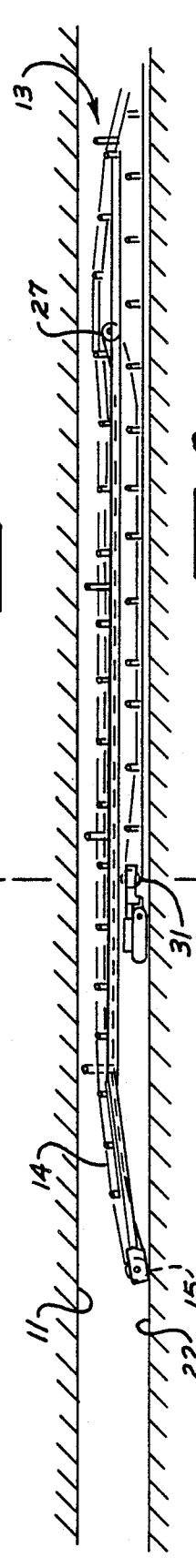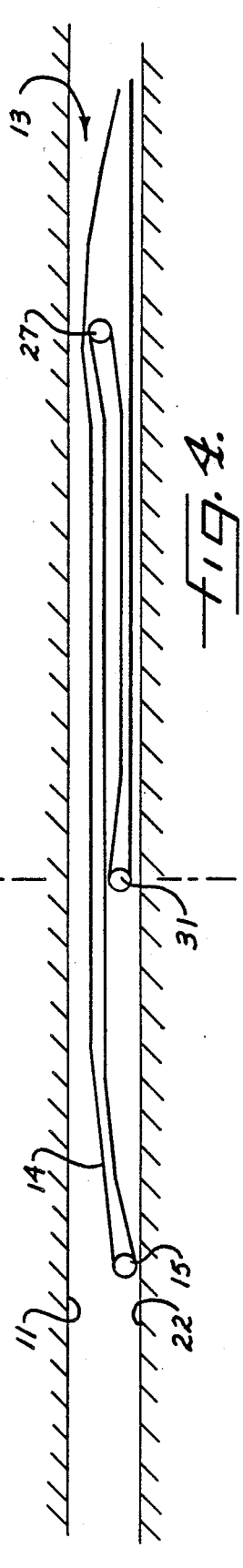

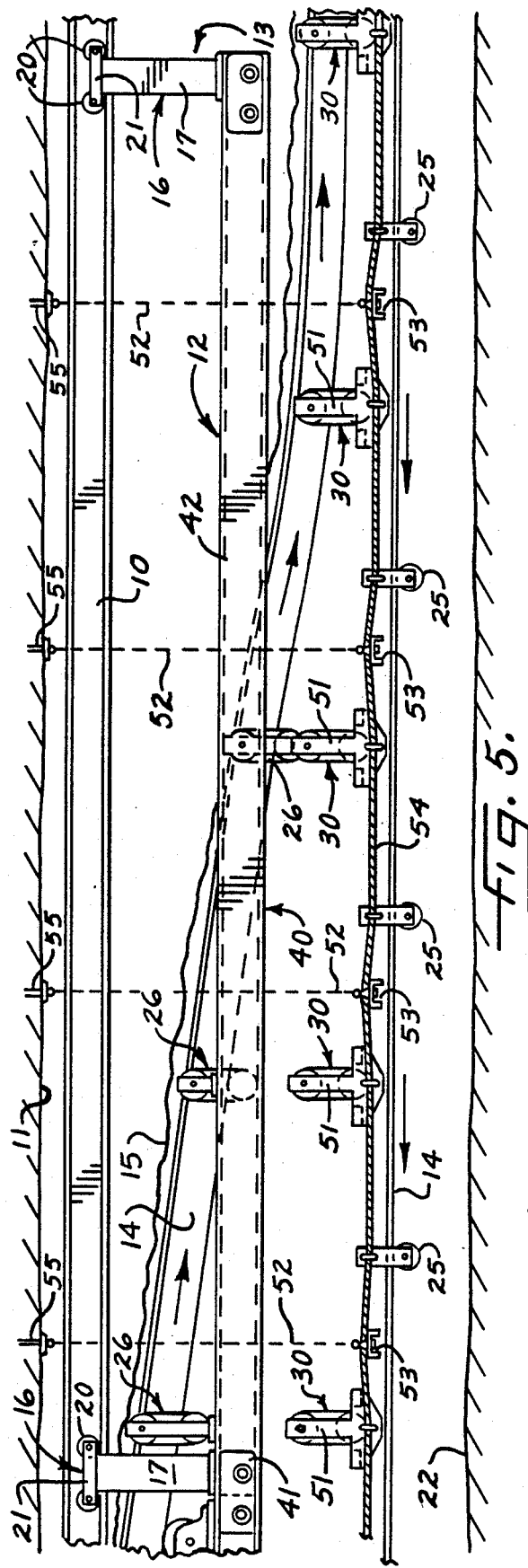
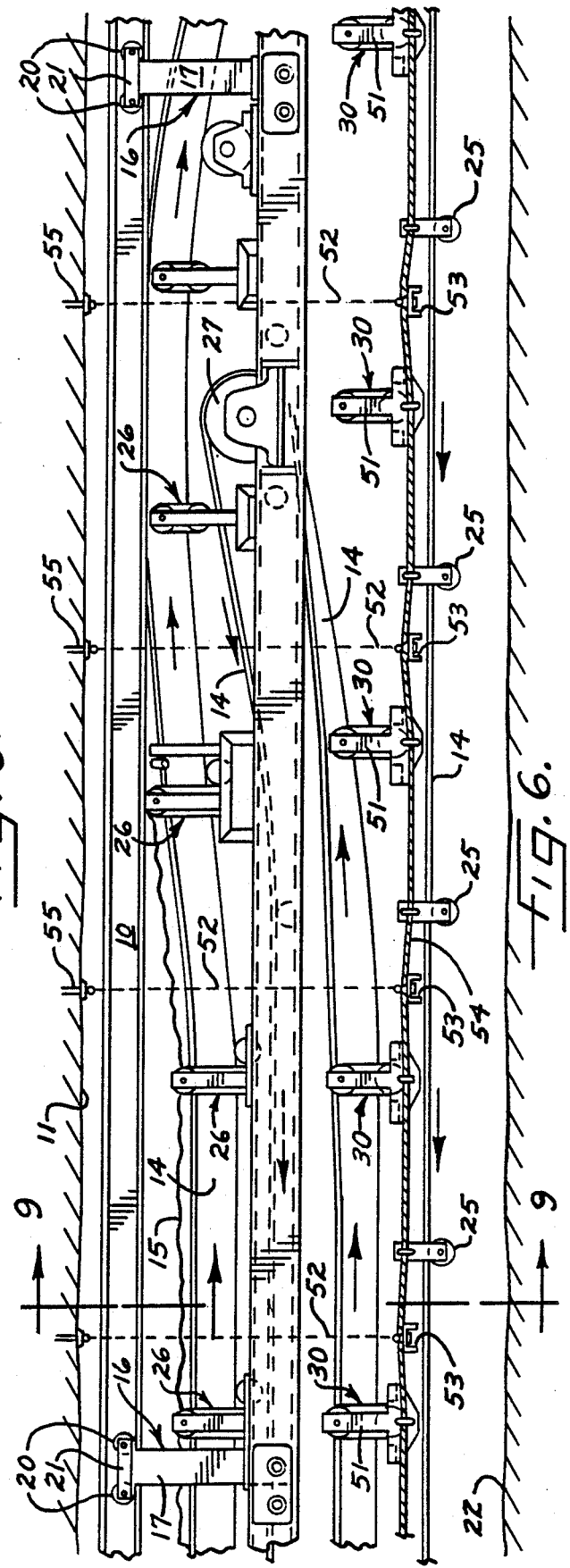

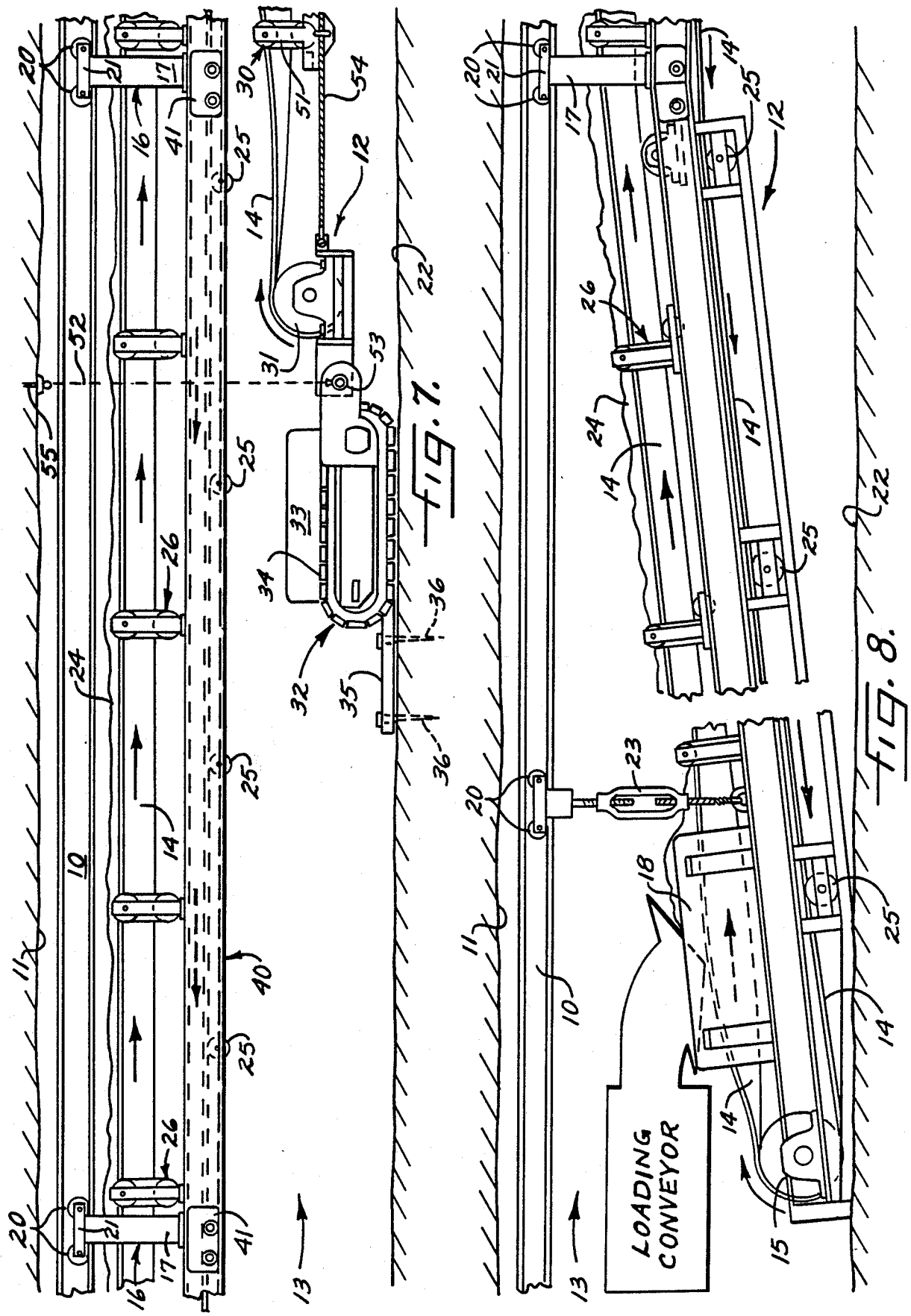

MONORAIL ADVANCED SYSTEM FOR CONVEYORS IN A MINING APPARATUS

FIELD OF THE INVENTION

The present invention relates to the transport of newly mined ore from a mining face within a mine to another desired destination, and in particular, relates to an improvement in the construction and use of conveyor systems for carrying ore along entries in a mine.

BACKGROUND OF THE INVENTION

Some of the major considerations in underground mining techniques are the methods and associated apparatus used to transport newly mined material from its natural location to a destination outside of the mine. All mining systems progress, and transport systems must be able to keep up with that progression. Generally speaking, such transport systems can include vehicles which can move independently of other machinery, vehicles which move in combination with other machinery (e.g. rail cars), and various types of conveyor systems.

In addition to the obvious reason for transporting material out of a mine—i.e. the desire to obtain ore—there are other productivity reasons for moving freshly mined ore as efficiently as possible. In particular, where freshly mined ore is allowed to accumulate within the mine, it obstructs, and in some cases prevents, the movement of mining machinery within the mine so that further extraction of fresh ore cannot take place until the already mined ore is moved out of the mine. Accordingly, movement of newly mined ore within a mine is an important productivity consideration in any mining system.

As new mining machines have been developed, and indeed as future generations of such machines are expected to develop, the need to efficiently move newly mined ore becomes more acute as the mining machines become more productive. If the systems for removing mined out ore from the mining location do not proceed on a rate comparable to the mining itself, the removal systems become the limiting factor in determining how fast ore can be removed from the mine. In short, improvements in the mining techniques and productivity are essentially worthless if their increased productivity is quenched by a lack of comparably increased productivity in the removal systems. Stated differently, at some point mining machine productivity becomes limited by haulage capacity; and if haulage capacity remains constant or decreases, the increase in mining machine productivity becomes essentially meaningless.

Accordingly, an ideal solution to the haulage problem would be some sort of continuous conveyor system in which the ore from the mining machine can be placed directly upon a conveyor and continue on that conveyor, or an appropriate system of conveyors, until it exits the mine. As would be expected, however, as mining proceeds, the various conveyors must be moved to keep up with the mining and the other associated transport systems. There thus exists a need in mining systems for conveyor belts, the length of which can be changed as mining proceeds.

One typical solution is known as a belt storage unit. A typical belt storage unit includes one end which is disposed near the mining or transport activity and another end which is disposed somewhat closer to the exit portion of the mine. Typically, a belt storage unit contains two stacks of return idlers with the excess belt material weaving back and forth between the stacked idlers. One or both of the stacks of return idlers are movable under electrical or hydraulic power so as to absorb or release conveyor belt material as the innermost end or "tailpiece" of the conveyor moves. Typically, however, the majority of belt storage units can only extend or retract in an unloaded condition, and perhaps more importantly, are not designed to operate in both directions; i.e. belt storage units usually can allow the panel belt to be retracted, but don't normally allow it to be extended. Furthermore, such extensible panel belts follow a rather complex series of movements and generally cannot operate when loaded with ore. Also, the number of idlers in the stacks, and the resulting amount of conveyor material which can be stored, is limited by the height of the mining tunnel, such tunnels typically having relatively limited vertical space.

Finally, the belts on conventional belt storage units generally must be moving in order for the belts to be extended, because the motors used to drive the belts typically lack sufficient horsepower to overcome friction when the belts are stationary. In other words, such units must be moving, but empty, in order to be adjusted.

Some other present techniques for dealing with the need to change the length of mining conveyors use carrier vehicles which support added supplies of belting material so that the belting material can be carried to the panel belt of a mine and then added in place. In yet other techniques, one or more cables are suspended between the tail and anchoring portions of a conveyor belt with a drum of belting material being carried on the cable so that as the suspended drum is pulled on the cables toward the anchor units, it retracts the belt. Other systems use movable "inby" (the innermost end of a conveyor, and where it is first loaded) and tail sections with movable supports in between for changing the length of a conveyor in a mining system.

All of these devices, however, require electrical or hydraulic power, most can only operate by either extending or retracting the length of the conveyor, but not both, and few have the capability to have their length either extended or retracted while they are both loaded and in conveying operation.

Accordingly, it is an object of the invention to provide a conveyor system which is extensible and retractable while loaded and while either operating or idle and which does not require its own power system, but which is passively extendable and retractable so that it can be extended and retracted using existing machinery in a mine to move it in the intended and desired direction.

SUMMARY OF THE INVENTION

The present invention is an apparatus for carrying, advancing and retracting a conveyor in a mine. The invention eliminates the need for separate storage of unused conveyor, and can be either advanced or retracted at will and while operating. The apparatus comprises rail means for extending along and being fixed to the roof of a mining tunnel, an elongate truss assembly movably suspended from the rail means for traveling along the rail means within a mining tunnel, and a conveyor carried by the truss assembly and extending along substantially the entire length of the truss assembly for being moved with the truss assembly along the rail means. The rail means defines the path of travel for the elongate truss assembly, and the position of the conveyor can be advanced and retracted within a mining tunnel by advancing or retracting the suspended truss assembly along the rail means.

The foregoing and other objects, advantages and features of the invention, and the manner in which the same are accomplished will become more readily apparent upon consideration of the following detailed description of the invention taken in conjunction with the accompanying drawings, which illustrate preferred and exemplary embodiments, and wherein:

DESCRIPTION OF THE DRAWINGS

FIG. 1 is a side elevational view of a mining tunnel and showing the conveyor assembly of the present invention in a generally extended position;

FIG. 2 is a schematic diagram of the path of the conveyor belt when the conveyor assembly is in the position illustrated in FIG. 1;

FIG. 3 is another side elevational view of the mining tunnel of FIG. 1 and showing the conveyor assembly in a generally retracted position;

FIG. 4 is a schematic diagram of the path of the conveyor belt when the conveyor assembly is in the position illustrated in FIG. 3;

FIG. 5 is an enlarged partial elevational view taken along segment 5 of FIG. 1;

FIG. 6 is another enlarged partial elevational view taken along segment 6 of FIG. 1;

FIG. 7 is another enlarged partial elevational view taken along segment 7 of FIG. 1;

FIG. 8 is another enlarged partial elevational view taken along segment 8 of FIG. 1.

DETAILED DESCRIPTION

Figure 9:
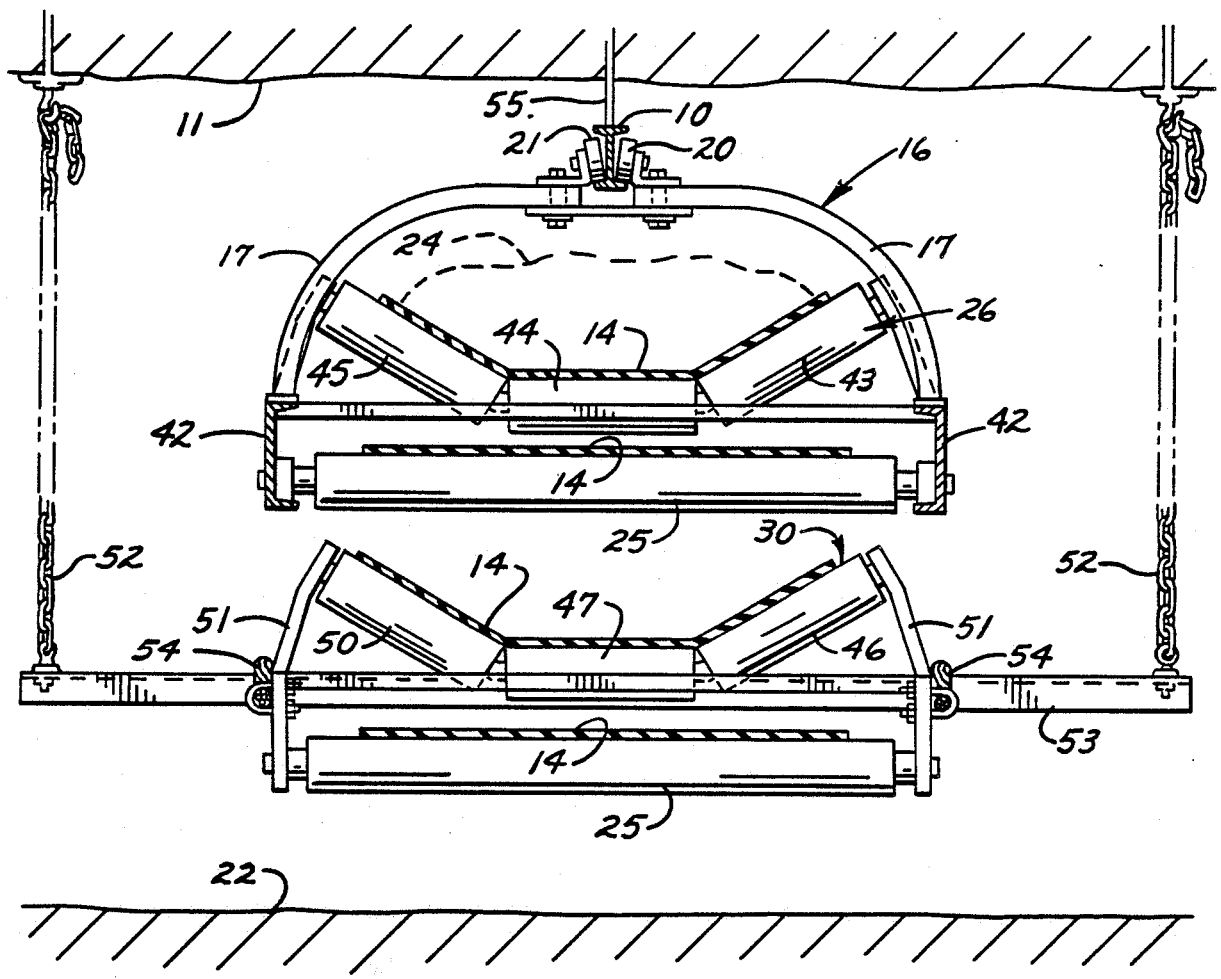
FIG. 9 is a cross-sectional view taken along lines 9—9 of FIG. 6.

FIGS. 1–4 provide an overall illustration of the present invention and its use. As seen therein, the invention comprises rail means shown in the preferred embodiment as the monorail 10 which extends along and is fixed to the roof 11 of the mining tunnel which is broadly designated at 13. An elongate truss assembly broadly designated at 12 is movably suspended from the monorail 10 for travelling along the rail means within the tunnel. The truss assembly 12 carries a conveyor belt 14 which extends along substantially the entire length of the truss assembly 12 for being moved with the truss assembly 12 along the monorail 10. The monorail 10 thus defines the path of travel for the elongate truss assembly 12, and the position of the conveyor belt 14 can be advanced and retracted within the tunnel 13 by advancing or retracting the suspended truss assembly 12 along the monorail 10.

As will be discussed in more detail later herein, FIG. 2 and FIG. 4 schematically illustrate relatively extended and relatively retracted positions respectfully of the truss assembly 12 and the conveyor belt 14. FIGS. 1 through 4 are schematic diagrams and are not drawn to scale, while the more specific features of the preferred embodiment are illustrated in FIGS. 5–9.

The innermost or "inby" portion of the invention is illustrated in more detail in FIG. 8. The inby portion comprises an inby pulley 15 positioned upon the forwardmost portion of the elongate truss assembly 12. As further seen in the detailed view of FIG. 7, the truss assembly 12 is carried on the monorail 10 by a series of truss idler assemblies 16 from which depend truss supports 17. The idler assembly 16 in turn comprises idler wheels 20 carried on a frame member 21 which is attached to the truss support 17. FIG. 8 illustrates that where the inby end of the truss assembly is lowered toward the floor 22 of the tunnel 13, the forwardmost truss support comprises a turnbuckle shown at 23 or any other similar adjustable element which can be adjusted to position the elevation of the inby end of the conveyor as desired.

FIG. 8 also illustrates portions of the path of the conveyor belt 14 shown loaded with ore 24 being carried from the inby end. The inby end, like much of the remainder of the truss assembly, is typically formed of a number of truss-forming metal elements which for the sake of clarity will not be individually referred to other than where necessary to explain the specific features and function of the invention. FIG. 8 also illustrates that the truss assembly 12 can also carry shields 18 which border the path of the belt 14. For the sake of clarity, the shields 18 are only illustrated in FIG. 8, but it will be understood that they can be positioned anywhere—or everywhere—along the truss assembly 12 as desired. As further illustrated in FIG. 8, the belt 14 travels empty towards the inby end of the truss assembly along lower portions of the truss assembly 12 and is carried upon return idlers 25 until it gets to the inby pulley 15. As the ore is loaded, the belt 14 returns along a set of transport idlers 26 which will be described in more detail with reference to FIG. 9, and carries the ore toward the desired destination.

The complementary "outby" portion of the truss assembly which is closer to the desired destination (often closer to the mine entrance) is illustrated in more detail in FIG. 5. FIG. 5 shows a number of the elements already described, including the monorail 10, the truss idler assemblies 16, portions of the truss assembly 12, the truss supports 17, the transport idlers 26, the belt 14, the return idlers 25, and the roof 11 and floor 22 of the tunnel 13. As illustrated in FIG. 5, the loaded belt 14, which travels for much of its extent generally adjacent the monorail 10, moves from the truss structure 12 to the troughing idlers 46, 47 and 50 (FIG. 9) to a position more adjacent the floor of the mine 22, from which the ore can be carried further outwardly, usually towards the entrance of the mine, and unloaded.

As illustrated in FIGS. 5 and 6, the lower, return path of the belt 14 may travel along the tunnel 13 in a more conventional fashion. The drawings illustrate chains 52 from which hang the channel-shaped support members 53 which in turn support the cables 54 to which idler supports 51 and idlers 25, 46, 47, 50 are fastened using any convenient clamping arrangement (FIG. 9). The support members 53 can also comprise sections of pipe or even I-beams, and are conventionally disposed at ten foot intervals along the tunnel 13.

FIG. 6 illustrates in some detail the pivot pulley 27 which forms a portion of the path of the conveyor belt 14, which is schematically illustrated in FIGS. 2 and 4. As seen in FIG. 6, the pivot pulley 27 is supported on the truss assembly 12 and receives the belt 14 as it reaches the pivot pulley 27 from the tail pulley (FIG. 7), and then pivots the belt 14 to send it to the inby pulley 15 which has been described earlier herein. FIG. 6 illustrates an additional feature, however, which comprises another set of idlers 30 upon which the belt 14 travels from the tail pulley to the pivot pulley. FIG. 6 also illustrates that the transport idlers 26 are positioned to carry the belt 14 over the pivot pulley 27 as the belt 14 passes the point on the truss assembly 12 where the pivot pulley 27 is positioned.

FIG. 7 illustrates the tail pulley 31 in more detail. The tail pulley 31 is also carried on the tension steel cables 54 and the chains 52, and although portable in the ultimate sense, generally remains stationary whenever the truss assembly is being moved along the monorail. The tail pulley 31 is anchored by a tail assembly generally designated at 32, which, in the illustrated embodiment, comprises a crawler mechanism 33 with tracks 34, anchor plate 35, and anchoring stakes 36. The remainder of the features illustrated in FIG. 7 have been described with respect to FIGS. 5, 6 and 8, and will not be specifically repeated herein.

The cooperation between the respective pulleys, the monorail 10, and the belt 14 are best illustrated by returning to the elevational and schematic views of FIGS. 1-4. As illustrated therein, because the truss assembly 12 is movable along the monorail 10, the inby and pivot pulleys 15 and 27 respectively move with the truss assembly 12 while the tail pulley 31 remains stationary.

The length of belt material of conveyor belt 14 is of fixed total length and extends between the inby pulley 15 and an outby pulley 37, which can be positioned in a manner similar to the tail pulley 31. As schematically illustrated in FIGS. 1 and 2, the outby pully 37 is often placed in a raised position from which it may dump ore onto another conveyor 38. The remaining portions of the conveyor belt 14 extend between the pivot pulley 27 and the tail pulley 31. In this arrangement, the effective length of the carrying path of the entire conveyor assembly is defined by the distance between the inby and outby pulleys 15 and 37. This carrying path can be lengthened or shortened within the tunnel 13 by moving the truss assembly 12 respectively either away from or towards the outby pulley 37. The remaining portion of the fixed length of conveyor belt 14 travels in an adjustable return path between the outby pulley 37, the tail pulley 31 and the pivot pulley 27 before returning to the inby pulley 15. In other words, whenever the truss assembly 12 is extended further into the tunnel 13, the conveyor carrying path increases in length between inby pulley 15 and outby pulley 37 as these pulleys move apart. This increase in length is matched and compensated for by an equivalent reduction in the distance (and in the length of the conveyor return path) between pivot pulley 27 and tail pulley 31 as the pivot and tail pulleys 27 and 31 move towards one another.

Alternatively, whenever the truss assembly 12 is retracted within the tunnel 13, the conveyor carrying path decreases in length between the inby pulley 15 and the outby pulley 37 a these pulleys move towards one another. This decrease in length is likewise matched and compensated for by an equivalent increase in the distance (and in the length of the conveyor return path) between pivot pulley 27 and tail pulley 31 as these pulleys now move away from one another.

In this manner, the conveyor belt 14 can be extended or retracted, and while carrying ore, or while stationary, all without any storage system for belt material other than the elegantly simple carrying and return paths between pulleys just described. Furthermore, because inby and pivot pulleys 15 and 27 are both mounted on the same truss assembly 12 suspended from the monorail 10, the forces imparted to the truss assembly 12 by the tension in the conveyor belt 14 are cancelled so that there is no net belt or conveyor tension tending to move the truss assembly 12 from any given position.

Because in either case belt material need not be stored, added, or removed, haulage can take place continuously even while the truss assembly 12 is being moved along the monorail in either extending or retracting fashion. In like manner, because movement of the truss assembly 12 does not require that belt material be frictionally dragged against itself, the truss assembly 12 can also be moved when the belt is stationary, giving the system tremendous flexibility in the manner in which it can be operated.

In preferred embodiments, the conveyor belt 14 comprises a belt which can be formed of rubber or other similar materials, but in other embodiments, the conveyor can comprise a chain conveyor or any other suitable conveyor. means appropriately carried by the elongate truss assembly 12. It will be understood that although the term "conveyor belt" or "belt" has been used in the specification and claims, other conveying means can be used which are the functional equivalents to the belt described with respect to the preferred embodiment.

FIGS. 7 and 9 illustrate some further details of construction of the preferred embodiment of the present invention. In order to maximize flexibility, the truss assembly 12 is formed from a series of segments referred to as "cars". FIG. 7 illustrates one such car broadly designated at 40 and which is defined by the respective truss idlers and depending truss supports illustrated at either end of FIG. 7. FIG. 9 is a cross-sectional view of such a car and shows the generally arch-shaped depending truss supports 17. One truss support 17 is carried at one end of each car 40. The cars are joined together by bolted joints generally designated at 41 in FIG. 7 and the remaining drawings, so that there is one truss support 17 adjacent each joint. The truss supports 17 can be formed of steel tubing and, as best illustrated in FIG. 9, the main portions of the truss assembly 12 are formed of channel-iron members 42.

FIG. 9 also illustrates that, in the preferred embodiment, the transport idlers designated in the drawings at 26 are preferably formed from three separate idlers 43, 44 and 45, respectively, which are arranged to form a shallow trough out of the conveyor belt material 14, to thereby carry the ore 24 in a somewhat more controlled fashion. The generally horizontally disposed return idlers 25 are illustrated in lower portions of FIG. 9, and in the cross-section illustrated, are present and carried by both the truss assembly 12 and the idler supports 51 which are in turn carried by the chains 52 and support members 53. Because FIG. 9 is taken along the portion of FIG. 6 which illustrates the invention between the pivot pulley 27 and the tail pulley 31, there is an additional set of idlers, previously noted as the tail-to-pulley idlers 30, which are likewise formed from three portions, 46, 47 and 50, which also flex the belt 14 into a trough-shaped configuration. These idlers are supported by supports 51, and because they need not move with the movable portions of the truss assembly 12, can be more or less permanently arranged within the tunnel 13, such as by hanging on vertical and horizontal support members 52 and 53, as illustrated in FIG. 5.

FIG. 9 also illustrates that the monorail 10 and the chains 52 are suspended from the roof 11 of the tunnel using any appropriate supports such as the roof bolts 55, and in turn the monorail 10 carries the truss idlers 16 which have been previously described.

As set forth earlier, FIGS. 1–4 have not been drawn to scale, but rather to highlight the relationships among various elements of the invention and the mining environment. It can be seen from FIGS. 2 and 4, however, that the path of travel of the truss assembly 12 on a conveyor belt 14 along the monorail 10 is defined by an advanced position in which the pivot pulley 27 is adjacent the tail pulley 31 and a retracted position in which the inby pulley 15 is adjacent the tail pulley 31. In actual practice, the system can operate to lengths of up to about 1,000 feet with lengths of 350 to 450 feet presently being convenient. The length of the truss assembly 12 and the conveyor belt 14 can be very easily adjusted by either adding or eliminating the cars 40 and material for the belt 14 as desired or necessary.

As mentioned previously, the combination of the monorail 10 and the suspended truss assembly 12 form a passive system which can be moved in either direction by using the existing machinery in the mine. Stated differently, the truss assembly 12 and the belt 14 it carries can simply be pushed or pulled. If desired, this eliminates the need for a power supply and associated mechanisms for moving the truss assembly 12, although the invention will work satisfactory when self-powered should conditions make this desirable or necessary. The conveyor belt 14 can be powered by any type of standard belt driving system, and such a system can typically be positioned adjacent the outby portion of the apparatus.

The invention thus provides the only method for extending or retracting the same conveyor within a mine and can accomplish either while the conveyor continues to haul ore or while the belt is stationary. The invention is elegant in its simplicity and in its solution to this particular problem.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A conveyor apparatus for being advanced and retracted in a mine, and which eliminates the need for separate storage of unused conveyor material, and which can be either advanced or retracted at will while loaded or unloaded and while operating or stationary, said apparatus comprising:
   rail means for extending along and being fixed to the roof of a mining tunnel;
   an elongate truss assembly movably suspended from said rail means for traveling along said rail means above the floor of a mining tunnel;
   a stationary support assembly for being positioned on the floor of a mining tunnel;
   an endless conveyor belt, portions of which are carried by said truss assembly and extend along substantially the entire length of said truss assembly for being moved with said truss assembly along said rail means and other portions of which are carried by said stationary support assembly; and
   vertically adjustable conveyor loading means carried by said moveable truss assembly at the loading end of said conveyor, wherein at least portions of said conveyor loading means can be supported by the floor of a mining tunnel for being loaded thereat;
   wherein said rail means defines the path of travel for said elongate truss assembly and the position of said conveyor can be advanced and retracted within a mining tunnel by advancing or retracting said suspended truss assembly along said rail means.

2. An apparatus according to claim 1 wherein said conveyor loading means comprises:
   an inby pulley positioned upon the forwardmost portions of said elongate truss assembly for being moved with said truss assembly and wherein said apparatus further comprises;
   a pivot pulley positioned upon rearward portions of elongate truss assembly for being moved with said truss assembly;
   a tail pulley for being positioned and remaining generally stationary upon the floor of a mining tunnel underneath said elongate truss assembly; and
   an outby pulley for being positioned and remaining generally stationary in a mining tunnel rearwardly of said elongate truss assembly.

3. An apparatus according to claim 2 wherein said conveyor is of fixed total length and extends between said inby pulley at the forwardmost portion of said truss assembly and said outby pulley positioned rearwardly of said elongate truss assembly and with intermediate portions of said conveyor extending between said pivot pulley and said tail pulley so that the effective length of the carrying path of said conveyor is defined between said inby and outby pulleys and wherein the effective length of the carrying path can be lengthened or shortened within a mining tunnel by moving said elongate truss assembly respectively away from or towards said outby pulley and wherein the remaining portion of the fixed total length conveyor travels in an adjustable length return path between said outby pulley, said tail pulley and said pivot pulley before returning to said inby pulley.

4. An apparatus according to claim 1 further comprising:
   a plurality of support idlers movably positioned upon said rail means for travelling along said rail means; and
   a truss support depending from each support idler to said truss assembly for movably supporting said truss assembly from said rail means.

5. An apparatus according to claim 1 wherein said rail means comprises a monorail.

6. An apparatus according to claim 1 wherein said conveyor comprises a panel belt.

7. An apparatus according to claim 6 wherein said panel belt is formed of rubber.

8. An apparatus according to claim 1 wherein said elongate truss assembly comprises a cage truss.

9. An apparatus according to claim 8 wherein said cage truss is formed of steel sections.

10. An apparatus according to claim 3 wherein the path of travel of said elongate truss assembly and said conveyor along said rail means is defined by an advanced position in which said pivot pulley is adjacent said tail pulley, and a retracted position in which said inby pulley is adjacent said tail pulley.

11. An apparatus according to claim 10 wherein said path of travel is at least about 250 feet.

12. An apparatus according to claim 3 wherein said tail belt pulley further comprises a crawler-mounted return pulley for being fixed in position upon the floor of a mine.

13. An apparatus according to claim 12 wherein said crawler-mounted return pulley further comprises an anchoring plate and anchoring stakes for securing said plate to the floor of a mine.

14. An apparatus according to claim 12 wherein said crawler-mounted return pulley carries sufficient mass to remain stationary during movement of said elongate truss assembly.

15. A conveyor apparatus for being advanced and retracted in a mine, and which eliminates the need for separate storage of unused conveyor material and which can be either advanced or retracted at will while loaded or unloaded and while operating or stationary, said apparatus comprising:
 a monorail for extending along and being fixed to the roof of a mining tunnel;
 an elongate truss assembly movably suspended from said monorail for traveling along said monorail within a mining tunnel;
 a stationary support assembly for being positioned on the floor of a mining tunnel;
 a vertically adjustable inby pulley positioned upon the forwardmost portions of said elongate truss assembly for being moved with said truss assembly and wherein said inby pulley can be supported by the floor of a mining tunnel for being loaded thereat;
 a pivot pulley positioned upon rearward portions of said elongate truss assembly for being moved with said truss assembly;
 a tail pulley on said stationary support assembly for being positioned and remaining generally stationary in a mining tunnel rearwardly of said elongate truss assembly; and
 an endless conveyor belt, portions of which are carried by said truss assembly and extending along substantially the entire length of said truss assembly and having a carrying path defined by said inby pulley and said outby pulley and a return path defined by said outby pulley, said tail pulley, said pivot pulley and said inby pulley;
 wherein said monorail defines the path of travel for said elongate truss assembly and the position of said conveyor belt can be advanced and retracted within a mining tunnel, and its carrying path lengthened or shortened, by advancing or retracting said suspended truss assembly along said monorail and the extent to which the length of the conveyor carrying path is extended or retracted is identically compensated for by the extent to which the return path is either shortened or lengthened as said inby and said pivot pulleys move with said truss and as said tail and outby pulleys remain generally stationary.

* * * * *